Aug. 5, 1930. H. H. HANSON 1,772,440
WINDROW HARVESTER
Filed Nov. 6, 1928 2 Sheets-Sheet 2

Inventor
HELMER HARTMAN HANSON,

By James A. Walsh.
Attorney

Patented Aug. 5, 1930

1,772,440

UNITED STATES PATENT OFFICE

HELMER HARTMAN HANSON, OF LAJORD, SASKATCHEWAN, CANADA, ASSIGNOR TO J. I. CASE COMPANY, OF RACINE, WISCONSIN, A CORPORATION

WINDROW HARVESTER

Application filed November 6, 1928. Serial No. 317,513.

My invention relates to improvements in windrow headers which are employed for cutting or heading standing grain and depositing the cut grain upon the stubble in windrow formation so that it may be properly dried by the sun and winds before being thrashed, this latter operation being performed by a traveling thrashing machine associated with a pick-up machine for gathering the grain and conveying it to such thrasher. I have found in practice that frequently the windrowed grain has not been satisfactorily deposited upon the stubble or ground, that is, the ridged formation is not of uniform shape, is more or less irregular through its upper portion and apex, and that its base is wider and scattered more thinly in some portions than in others, so that there is a lack of uniformity and compactness throughout the windrow, which is unfavorable to the efficient operation of a pick-up machine, and a windrow of such imperfect character is not suitable for resisting the action of the winds and weather. It is my object, therefore, to improve a windrow header in such manner that the cut grain, as it is being conveyed therefrom, will be compressed so that it will be deposited in such compact and regular form that it will not be appreciably disturbed by the wind either at the time of depositing or at any time after its formation, yet not sufficiently dense as to prevent thorough drying, and in which improved condition it may be cleanly picked up for thrashing.

Figure 1:
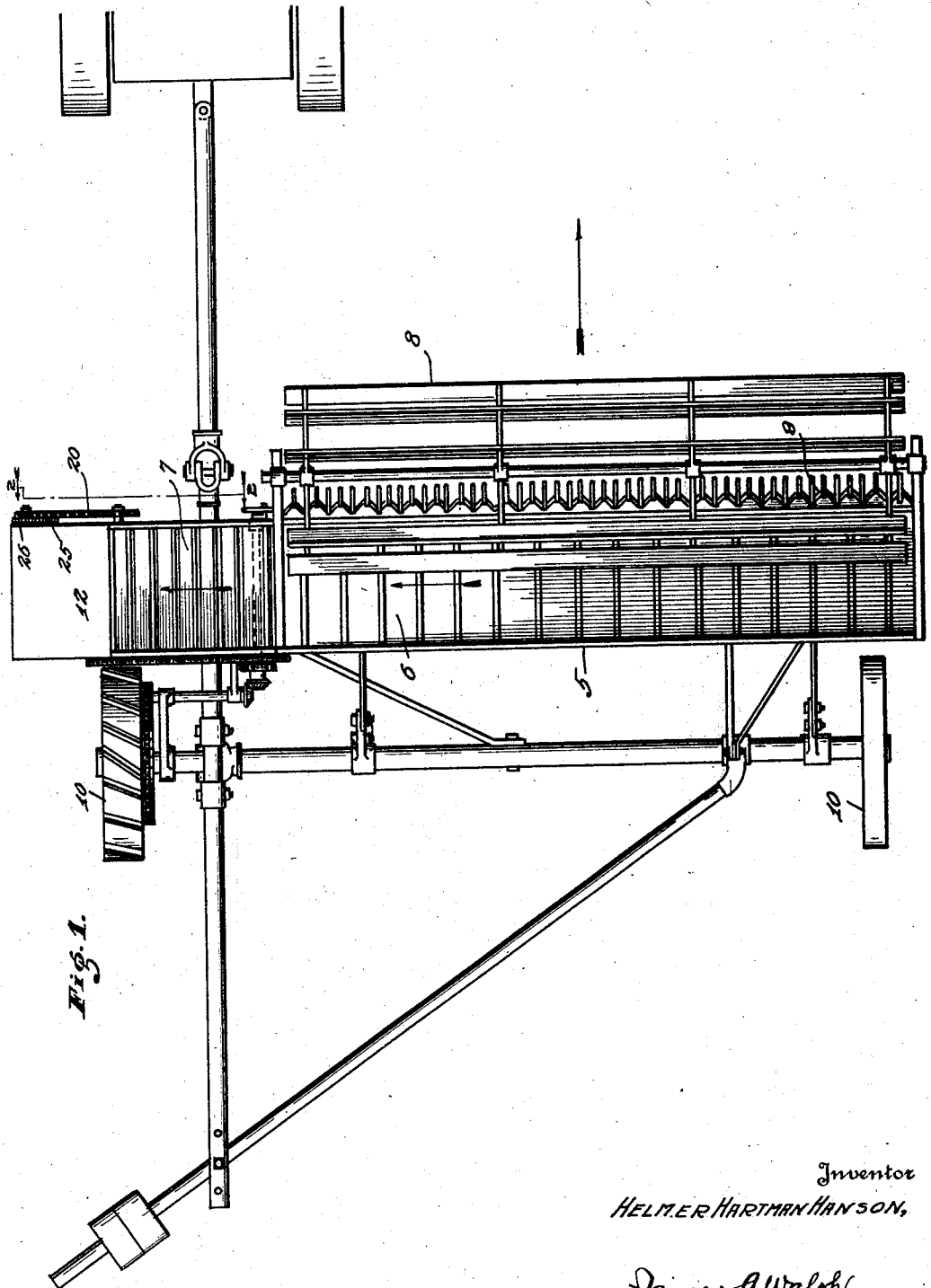
Figure 2:
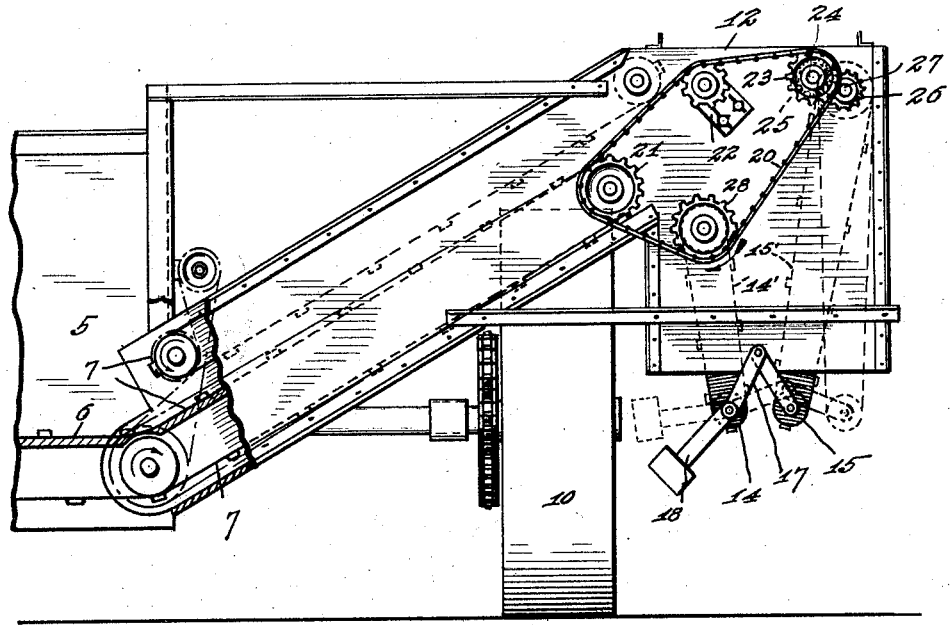
Figure 3:
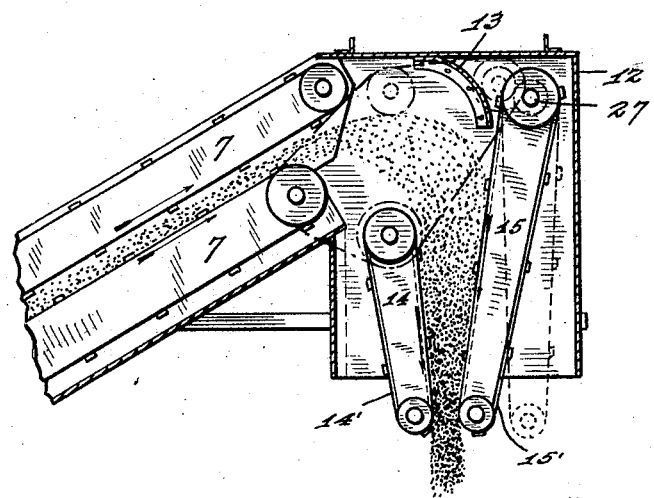

In the accompanying drawings, forming part hereof, Figure 1 is a plan of a windrow header embodying my invention; Fig. 2, a fragmentary elevation showing my improved compressor and discharger as seen when looking in the direction of the arrows 2—2 in Fig. 1; and Fig. 3 is a detail section of said improvement.

In said drawings the numeral 5 indicates a header of any preferred form, which may embody a platform including a conveyer 6, 7, reel, 8, cutter-bar 9, supporting wheels 10, and other equipment essential to the operation of such a machine, but as such a structure is no part of my present invention the same will only be referred to incidentally in describing the improvement.

To the outer end of the conveyer section 7 I secure a discharger, 12, in which is mounted compressing mechanism arranged and operating as follows: The discharger 12 may be of rectangular or other suitable formation, and in which I prefer to mount a deflector, 13, which directs the headed grain, carried by the conveyer 7 from the header, in a downward direction between a conveyer 14 and 15 comprising endless belts 14′ and 15′. The conveyer member 14 is stationary, while the opposite conveyer member 15 is of a swinging or yielding character, as indicated by the dotted lines in Figs. 2 and 3, so that as the material, which at times is more or less bunched or in irregular masses, is being discharged downwardly between and compressed by the conveyer, the member 15 will yield gradually within its range of movement, but at the same time will have a constant pressing action against the material until it has been discharged through the lower ends of the conveyers, in which manner such material will have been compressed into a substantially uniform mass. This uniform massed discharge, as indicated, is effected by the continuous pressure of member 15, which is assured by the operation of retarding means such as the toggle system 17, in connection with a weighted arm 18, mounted upon the conveyer members, which toggle counteracts the pressure of massed material against conveyer member 15 by controlling the gradual movement of the latter so that it will constantly press against the material, its lower end being urged into close relation with member 14, and thus confining the discharging material in substantially uniform volume, with the result that as it leaves the discharger in compressed condition it will be strewn upon the stubble in compact windrow formation without undue scattering or irregularity in build and be of such density as to withstand ordinary winds, although of such fluffiness in character as to be readily susceptible to the drying action of the elements.

It will be understood that in employing retarding mechanism such as the toggle system 17, 18, the movement of conveyer member 15 away from member 14, caused by pressure of material between said members, is appreciably resisted, so that a compressing effect will be constantly imparted to the material, which, as it is carried down, will be gradually more compressed to the point of discharge, the action of the weighted arm 18 at all times pulling the swinging conveyer member 15 toward member 14. The endless belts 14′, 15′, travel downwardly and thus cooperate in discharging the material in compressed form, which operation may be accomplished by any suitable driving mechanism, that which I prefer, as shown in Fig. 2, comprising an endless chain, 20, running about a sprocket, 21, on a shaft of conveyer section 7, thence over an adjustable chain tightener, 22, sprocket, 23, mounted on shaft, 24, which sprocket is associated with a gear, 25, meshing with gear, 26, on shaft 27, for actuating yielding conveyer member 15, and said chain 20 continuing around sprocket, 28, which drives conveyer member 14, the direction of travel of said members being indicated by the arrows in Fig. 3.

In field practice I have demonstrated that a header equipped with my improved compressor and discharger is capable of depositing material in highly satisfactory windrow formation, and as the compressing mechanism is protected from winds by the discharger casing 12 the continuous operation of compressing is undisturbed, so that at the place of discharge from the conveyer 14—15 such material is deposited upon the ground in compact condition without appreciable scattering and thus may be readily gathered by a pick-up machine traversing the windrow after the material has sufficiently dried.

I claim as my invention:

1. The combination, with a windrow harvester, of means for receiving material from the harvester, and a conveyer associated with the receiving means comprising two vertically arranged members one of which is yieldingly mounted in relation to the opposing member for compressing the material and discharging the same in compact condition.

2. The combination, with a windrow harvester, of means for receiving material therefrom, a conveyer comprising members through which the material passes under compression, one of said members being yieldingly mounted, and means connecting the lower end of the yielding member with its opposed member for controlling the movement of the yielding member during its compressing operations.

3. The combination, with a windrow harvester, of means for receiving material therefrom, a conveyer comprising members through which such material passes under compression, one of said members being yieldingly mounted, and a toggle system connecting the lower end of the yielding member with its opposed member for controlling the movement of the yielding member during its compressing operations.

4. The combination, with a windrow harvester, of means for receiving material therefrom, a conveyer comprising members through which the material passes under compression, one of said members being yieldingly mounted, a toggle connecting the lower end of the yielding member with its opposed member, and a weighted member associated with the toggle for controlling the movement of the yielding member during its compressing operations.

5. The combination, with a windrow harvester, of means for receiving material therefrom, a conveyer comprising members through which material passes and is discharged, means for actuating the conveyer, and means associated with said members for controlling the compressing action of one in relation to the other.

6. The combination, with a windrow harvester, of means for receiving material from the harvester, means in the receiving means for directing the material downwardly, and compressing members between which the material is received and compressed said members conveying such material therebetween and discharging the same in compact condition to form windrows.

In testimony whereof I affix my signature.

HELMER HARTMAN HANSON.